United States Patent Office 3,431,172
Patented Mar. 4, 1969

3,431,172
LIVE CELL DILUENT AND PROCESS
Ambrose H. J. Rajamannan, Anoka, Minn. (103 Landmark Drive, Eastern Heights, Ithaca, N.Y. 14850)
No Drawing. Continuation-in-part of application Ser. No. 418,304, Dec. 14, 1964. This application July 12, 1965, Ser. No. 471,424
U.S. Cl. 195—1.8        9 Claims
Int. Cl. C12k 9/00; A01n 1/02

ABSTRACT OF THE DISCLOSURE

This disclosure concerns the problem of providing a suitable carrier preservative for freezing live cells and is particularly useful in the field of preserving cells for insemination in a buffered extract of dried egg yolk.

---

This invention relates to an improvement in the art with respect to the method of providing an improved and comparatively inexpensive carrier for live animal cells and the products thereof and is a continuation-in-part of my original application Ser. No. 418,304, filed Dec. 14, 1964. More particularly and more specifically this improvement relates to a method of preparing a buffered extract of dried egg yolks, preferably without and less preferably with a further diluent material as a carbohydrate, a sugar material, or mixture of such materials, as an improved carrier and preservative for live mammalian and live avian sperm cells and animal tissue utilized in the liquid form and derived from a dry, frozen or liquid state.

The sensitivity of live cells and particularly sperm cells to freezing, in carriers, is well known to the art. Most carriers known to the art do not provide a high retention of cell life, after freezing. Consequently control of cell life over long periods of time becomes important for best results in subsequent use, as in insemination, as herein described.

In general, certain alcohols, sugars and carbohydrates including whole fresh egg yolk have been known and used in providing carriers for live cell matter. Whole dried egg yolk has been found and reported in the literature to be detrimental. Whole fresh yolk citrate with glycerol or whole fresh yolk citrate modified with sugar and/or alcohol extenders are known to the art of semen freezing. Such materials, as known, allow freezing of live cell matter, as semen, only 10 to 20 hours after dilution and normally not less than about 10 hours after dilution. It is therefore apparent that the art is in need of a new method of preparing an improved live cell carrier such as herein described.

For example there is no dilutent for live sperm cell matter known in the literature or in use which allows semen to be frozen in the conventional manner of ampule freezing before a minimum of 10 hours. Thus it will become apparent that when the present extract or carrier, as herein provided, permits freezing of sperm cell matter within 1 to 5 hours, after dilution, that a major improvement in the art of semen preservation is provided; aside from improving the yield of live active cells in the final product.

Accordingly it is the principal object of this disclosure to provide the art with an economical preservative extract of dried egg yolk, useful as a liquid medium, which may be used less preferably with an extender or additive agent as carbohydrate and/or sugar, in combination with live cell matter, with substantially 100% of live cell recovery.

It is particularly an object of this invention or improvement to provide the art with an improved carrier for live sperm cells as a particular extract of dried egg yolks modified with a buffering agent, which may be utilized, as is, and either with, but preferably without, an additional extender as a carbohydrate, sugar, or sugar alcohol and the like suitable agent or mixtures of the same.

It is a still further and most important object of this invention or improvement to provide the art with an improvement in the method of providing a carrier agent for live sperm cells comprising a particular buffered extract of dried egg yolk material in combination with live sperm cells which may be prepared with and preferably without additional extender material, and retained indefinitely in the frozen state with an increased percentage of cell life and productive yield upon thawing and insemination usage.

In general, it may be started that the principal new and useful objects and advantages of the method and products herein provided consists of the initial preparation of a buffered extract of dried egg yolks which may be used to advantage with live sperm cells, or less preferably in admixture with other known additive added before or after the extraction and to which the live sperm cells are added. As indicated, the preferred carrier is a particularized, buffered extract of dried egg yolk which may be dried, frozen, or used directly for dilution, preferably without any additive material.

The following description setting forth in more detail certain illustrative embodiments as provided to benefit the art, these being indicative of the various ways in which the principles of this disclosure may be employed.

To illustrate by specific examples the following are provided:

EXAMPLE 1

| | | |
|---|---|---|
| Dried egg yolk | grams | 50 |
| Sodium citrate dihydrate | do | 29 |
| Water | cc | 1000 |

The sodium citrate is dissolved in the water at normal room temperature and the dried egg yolk dispersed in the buffer solution. The egg yolk does not go into a solution but remains finely dispersed. On standing in a container it separates into three fractions, an upper yellow coagulum, a middle translucent fluid and a precipitate of flaky particulate fraction. The translucent internatant is carefully separated by conventional means, as by decantation or siphoning from the upper coagulum fraction. The particulate fraction may or may not be taken along with the internatant translucent fraction. This operation can be done in either ambient temperature or in a cold room.

This liquid extract consisting of a buffer and the extract of dried egg yolk constitutes a diluent ready for use in a conventional manner. In the preparation of sperm cell freezing process a 5%–10% glycerol by volume is added before freezing in a manner well known to the art of semen freezing except that instead of freezing in the conventioned 10 to 20 hours time, this new preparation can be frozen in 1 to 5 hours time with an improvement in percentage yield of live cell material, with the ability to freeze fresher semen.

EXAMPLE 2

| | | |
|---|---|---|
| Dried egg yolk | grams | 50 |
| Sodium citrate dihydrate | do | 29 |
| Water | cc | 1000 |

The sodium citrate is dissolved in the water at normal room temperature and the dried egg yolk is dispersed in the buffer solution. Mixing of the buffering agent and water may be done at any suitable temperature, but the egg yolk powder is added only to the buffer solution at 65° C. and under. After mixing the egg yolk powder to the buffered solution, the mixture is centrifuged and the mixture separates into three fractions. The three fractions are formed as an upper coagulum, a middle translucent fraction and a lower particulate fraction. The middle fraction is separated and collected and constitutes the diluent ready for adding sperm cells for insemination use, without modification, or directly in a sperm cell freezing process wherein the fraction contains 5% to 10% glycerol by volume, added as is known to the art.

EXAMPLE 3

| | | |
|---|---|---|
| Dried egg yolk | grams | 50 |
| Sodium citrate dihydrate | do | 29 |
| Water | cc | 1000 |

The sodium citrate dihydrate is dissolved in water as indicated. The dried egg yolk powder is dispersed in the buffer solution. This mixture is filtered through a coarse filter. This method of extraction is not preferred as it is a slow tedious process.

The filtrate is a clear fluid and is ready for immediate use or use in the sperm cell freezing process. A 5% to 10% glycerol should be added prior to freezing as is well known to the art.

The following illustration shows how some modifications can be made in the quantities of the components.

EXAMPLE 4

| | | |
|---|---|---|
| Water | cc | 1000 |
| Dried egg yolk | grams | 5–100 |

Buffer agent to yield a final osmotic pressure at 225–375 milliosmoles and pH range of 6–7.5.

The buffering agent described here may be any suitable salt or acid and alkaline agent or mixtures of same. For example such agents as known alkaline citrates, acetates, phosphates carbonates may be used to provide a buffer medium of pH range of 6 to 7.5 and an osmotic pressure between 225–375 milliosmoles. Such buffering agents are heretofore known to the art.

The preparation of a dried extract, as provided in Examples 1 to 4 can be obtained by conventional spray drying, freeze drying or vacuum drying. The preparation of a frozen extract as provided in Examples 1 to 4 can be obtained by conventional freezing. In the case of the dry product it can be reconstituted with water and the frozen product can be thawed before use.

The preparation of a freezing medium with the dried egg yolk extract in combination with live sperm cells and the freezing process is optional with regard to concentration and rate of freezing, as is known to the particular field of use in preservation and extending of live sperm cell matter. For the above tests the dilution was 1 part semen to 100 parts preservative and extender diluent, as is commonly used for insemination of bull semen. The application for insemination is otherwise of the same order as known to the art.

Results of comparison of this extract to whole egg yolk citrate showed a significant improvement in yield of live sperm cells after freezing.

This extraction as stated above is a method of fractionating the beneficial lipo-protein and protein components of yolk that are essential for freezing live cells and discards certain harmful lipid components and denatured proteins in the upper coagulum fraction.

The proof of the advantages in this extraction is the elimination of complex chemical process in extraction of the beneficial component of egg yolk for freezing, the high yield in live undamaged cells after freezing, and the comparative cheapness of making this extender coupled with the ability to allow freezing of sperm cells in 1 to 5 hours.

In experimental studies with semen obtained from cocks, turkeys and stallions this extract showed it was capable of protecting the sperm cells from injury due to freezing.

In the above examples, additives in the nature of amino acids, fatty acids, sugars, may less preferably be added.

As indicated conventional additive materials in the form of sugar-alcohols, as glucose and the like can be added before or after extraction in amounts of .05% to 20% by weight. However when in excess of 5% by weight the results are not as good as with the unmodified extract of buffered dried egg yolk. This material can be dried for future use, frozen or stored under refrigeration in the liquid state. Mixed with live cell matter, the extract can be ampuled and frozen in 1 to 5 hours.

For example: To the extracts of Examples 1 to 4, less preferably, a natural occurring honey or other complex sugar material, or conventionally known sugars or amino acids or fatty acids or mixtures of the above materials may be added in amounts up to 5% by weight without increase in freezing time. However, such additives are found not to be necessary unless possibly a cell feeding agent is needed.

The extension and preparation of semen in the above extract follows conventional methods. For example, semen is diluted from 1 to 20 to 1 to 100 parts extract depending on the quality. This mixture is cooled to about 5° C. for about 3 hours and glycerol in an amount of about 5% to 10% by volume of final concentration is added and the mixture ampuled and frozen, by conventional freezing within an hour. The freezing rate is preferably a fast rate of 30° to 70° C. per minute. A slower freezing rate is less acceptable.

To illustrate, the value of the extract lies in protecting a higher percentage of the live sperm cells from freeze kill.

| | Percentage live sperm cells | |
|---|---|---|
| | Before freeze | After freeze |
| (1) Dried whole egg yolk in citrate | 60 | 5 |
| (2) Dried egg yolk extract of Examples 1 to 4 alone | 60 | 60 |
| (3) Dried egg yolk extract of Examples 1 to 4 with 5% glucose | 60 | 30 |
| (4) Dried egg yolk extract of Examples 1 to 4 with 5% fructose | 60 | 25 |
| (5) Dried egg yolk extract of Examples 1 to 4 with 2% honey | 60 | 45 |

The preparation of preservative and extender mediums in combination with live cell materials is well known to the art and as described in the Canadian Patent No. 682,906 issued Mar. 24, 1964. The particulars therefore, in preparing live cell mixtures of the herein described preservative diluent and extender are optional with regard to concentrations of cell matter and diluent, as is known to the particular field of use in preservation and extending of live mammalian cell matter. For the above tests the dilution was 1 part semen to 100 parts preservative and extender diluent, as is commonly used for insemination of bull semen. The application for insemination is otherwise of the same order as known to the art.

The extract of dried egg yolk as described in Examples 1 to 4 when used as a perfusion medium in presence of glycerol on animal cell matter and tissues bestowed a remarkable ability to these cells and tissue to withstand freezing down to liquid nitrogen temperatures.

From the above description and subject matter of disclosure it will be apparent that some modifications as herein set forth may be made without departing from the spirit and scope thereof, as embodied in the terms of the following claims.

The embodiment of my invention or improvement in the art and in which an exclusive property or privilege is claimed are defined as follows:

1. The method of providing an economically improved diluent for live mammalian and avian cells consisting of mixing dried egg yolks with water and a buffering agent in an amount to obtain a pH value of 6 to 7.5 and an osmotic pressure of 225 to 375 milliosmoles, forming the liquid mixture into 3 fractions comprising a coagulum, a translucent liquid and a particulate precipitate, separating the translucent fraction from the coagulum, and preserving the separated translucent fraction.

2. The method of claim 1 including mixing live sperm cells and glycerol with the separated fraction and freezing the mixture.

3. The method of claim 1 including adding up to 5% additive selected from the group consisting of honey, alcohol, sugar, amino acid, fatty acid, and mixtures of the same, approximately 5%–10% glycerol by volume, and live animal cells and freezing the mixture in 1 to 5 hours.

4. The method of claim 1 including the steps of adding glycerol to the separated fraction, adding thereto a member selected from the group consisting of live animal tissue, live mammalian sperm cells and avian sperm cells in an amount of between 1 to 20 parts to 1 to 100 parts to the separated fraction, cooling the cell mixture, and freezing the cell mixture in about 1 to 5 hours.

5. The product obtained from the method of claim 1.

6. The product of claim 5 including live sperm cells mixed and preserved therein.

7. The product of claim 5 having the water removed and the residue contained in a dry state.

8. The product of claim 7 having water added thereto and contained in a frozen state.

9. The product of claim 8 including live cells added thereto and preserved therein.

References Cited

UNITED STATES PATENTS

| 3,185,623 | 5/1965 | Smith et al. | 167—53 |
| 3,005,756 | 10/1961 | Van Demark et al. | 167—74 |

FOREIGN PATENTS

| 368,672 | 6/1961 | Japan. |

F. CACCIAPAGLIA, JR., *Primary Examiner.*